(12) United States Patent
Maruyama et al.

(10) Patent No.: US 9,671,820 B2
(45) Date of Patent: Jun. 6, 2017

(54) COMMUNICATION DEVICE, COMMUNICATION METHOD, AND COMMUNICATION SYSTEM

(75) Inventors: Kiyoyasu Maruyama, Tokyo (JP); Kenji Esumi, Tokyo (JP); Satoshi Michihata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 543 days.

(21) Appl. No.: 14/352,110

(22) PCT Filed: May 23, 2012

(86) PCT No.: PCT/JP2012/063115
§ 371 (c)(1),
(2), (4) Date: Apr. 16, 2014

(87) PCT Pub. No.: WO2013/077012
PCT Pub. Date: May 30, 2013

(65) Prior Publication Data
US 2014/0258576 A1  Sep. 11, 2014

(30) Foreign Application Priority Data
Nov. 25, 2011  (JP) ................................ 2011-257755

(51) Int. Cl.
G06F 1/12 (2006.01)
G06F 13/42 (2006.01)
H04L 29/06 (2006.01)

(52) U.S. Cl.
CPC ............ *G06F 1/12* (2013.01); *G06F 13/4291* (2013.01); *G06F 13/4295* (2013.01); *H04L 69/22* (2013.01); *H04L 69/28* (2013.01)

(58) Field of Classification Search
None
See application file for complete search history.

(56) References Cited

U.S. PATENT DOCUMENTS

| 6,799,233 | B1 | 9/2004 | Deshpande et al. |
| 7,509,446 | B2 | 3/2009 | Hayashita |
| 2008/0189459 | A1* | 8/2008 | Takeuchi ............ G06F 13/4295 710/110 |

FOREIGN PATENT DOCUMENTS

| JP | 2-244311 A | 9/1990 |
| JP | 2001-75878 A | 3/2001 |

(Continued)

*Primary Examiner* — Idriss N Alrobaye
*Assistant Examiner* — Dayton Lewis-Taylor
(74) *Attorney, Agent, or Firm* — Birch, Stewart, Kolasch & Birch, LLP

(57) ABSTRACT

A slave device (20), which is a communication device, receives and analyzes commands, and returns the results to a master device (10). During the command analysis period, an IIC control unit (205) and a CPU (210), which form a control unit, control an SCL control unit (201) so as to stop an SCL signal. When the value of a timer (206) is equal to or less than a threshold value, transmit data are saved in a transmission FIFO (203), control for stopping the SCL signal is canceled, and in synchronization with the SCL signal, an SDA control unit (202) transmits the data saved in the transmission FIFO (203) to the master device (10). When the value of the timer (206) exceeds the threshold value, control for stopping the SCL signal is canceled, the clock control unit is placed in a state to receive the clock signal, and the SDA control unit (202) is placed in a state to receive a slave address indicating a communication device that operates in the slave mode.

17 Claims, 11 Drawing Sheets

(56) References Cited

FOREIGN PATENT DOCUMENTS

| | | | |
|---|---|---|---|
| JP | 2004-534322 | A | 11/2004 |
| JP | 2007-164765 | A | 6/2007 |
| JP | 2008-197752 | A | 8/2008 |
| JP | 2008-293230 | A | 12/2008 |
| JP | 2009-244991 | A | 10/2009 |
| JP | 2011-70282 | A | 4/2011 |
| WO | WO 03/005211 | A2 | 1/2003 |

* cited by examiner

COMMUNICATION DEVICE, COMMUNICATION METHOD, AND COMMUNICATION SYSTEM

TECHNICAL FIELD

The present invention relates to a communication device, a communication method, and a communication system.

BACKGROUND ART

One data communication protocol for inter-device communication in an electronic apparatus is the IIC (Inter Integrated Circuit) protocol (a serial communication protocol developed by Philips Ltd.). In IIC, a plurality of devices are interconnected via an SCL signal line for an SCL (serial clock) signal and an SDA signal line for an SDA (serial data) signal, each signal line being a bidirectional open collector signal line pulled up to the power source through a resistor. A bus configured from an SCL signal line and an SDA signal line is referred to as an 'IIC bus', and a communication protocol using an IIC bus is referred to as an 'IIC protocol'. The plurality of devices connected to an IIC bus include a master device capable of controlling other devices by controlling the SCL and SDA signals and a slave device controlled by the master device; each device has its own address. Plural master devices and plural slave devices can be connected to a single IIC bus.

In IIC, the master device operates, for example, as follows. When starting communication, the master device checks whether another device is accessing the IIC bus. Absence of such access can be confirmed by detecting that both IIC bus lines, the SCL signal line and the SDA signal line, are in the high state. Next, if no device is accessing the IIC bus, the master device issues an IIC start condition, transmits information specifying the address of the device with which it wishes to communicate and the read or write direction, and upon receiving a response from that slave device, then transmits necessary data to the slave device. The necessary data can be determined on the basis of a protocol established between the two devices. In IIC, at the end of communication, the master device generates a stop condition, thereby placing both the SCL signal line and SDA signal line in the high state.

IIC also permits a scheme in which the master device transmits data to the slave device and the slave device returns a response indicating whether it has correctly received the data to the master device. In this scheme, the master device issues a start condition, transmits information specifying the address of the slave device and the write direction, and then transmits data. Next, the master device issues another start condition and transmits information specifying the slave address and the read direction, and the slave device sends the master device a response indicating whether or not it has correctly received the data. When a communication system conforming to the IIC standard is configured in this way, the master device can definitely confirm that the data have been transmitted to the slave device (see patent reference 1, for example).

In IIC, it sometimes happens that the slave device cannot receive signals normally from the master device for some reason, or that the SCL signal line or SDA signal line becomes stuck in the low state, making communication impossible. In a proposed remedy to these situations, a signal line other than the IIC bus lines is used to reset a slave device that is unable to communicate (see patent reference 2, for example).

PRIOR ART REFERENCES

Patent References

Patent reference 1: JP 2009-244991 (paragraphs 0050-0051, FIG. 1)
Patent reference 2: JP 2008-197752 (paragraphs 0206-0208, FIG. 1)

SUMMARY OF THE INVENTION

Problems to be Solved by the Invention

In the method proposed in the communication system in Patent Reference 1, when the slave device transmits data to the master device, the slave device drives the SCL signal line low to make the master device wait while the transmit data are being prepared. This method is problematic, however, because the period during which the slave device ties up the IIC bus by driving the SCL signal line low, that is, the period during which other communication devices on the IIC bus are unable to communicate, can become long, as when computationally intensive processing is carried out, for example.

Since keeping the IIC bus tied up for a long time by communication between a specific master device and a specific slave device is undesirable for the system, it is also possible to free the IIC bus by resetting the slave device via another signal line. When the slave device is reset by a signal carried on an external signal line, however, there is the problem that the reset slave device restarts, and during the time until completion of the startup process (which can be long), IIC communication errors occurs and the operation of the communication system is suspended, so the time during which other communication devices on the IIC bus are unable to communicate can still become long.

It is therefore an object of the present invention to provide a communication device, a communication method, and a communication system that can reduce the time in which a synchronous serial communication bus consisting of a clock signal line and a data signal line is tied up.

Means for Solving the Problem

A communication device according to the invention is a communication device operating in a slave mode, that receives a command transmitted from a master device, which is a communication device operating in a master mode, by use of a synchronous serial communication bus including a clock signal line for transmitting a clock signal and a data signal line for transmitting data, analyzes the command, and returns a result of the analysis to the master device by use of the bus. The communication device includes a timer that starts when the master device starts communication with the communication device operating in the slave mode, a timer threshold value storage unit that stores a predetermined threshold value, a clock control unit that receives the clock signal from the master device through the clock signal line, and performs control for stopping the clock signal from the master device, a data control unit that transmits data to and receives data from the master device through the data signal line, a transmission temporary storage unit that temporarily saves the data transmitted by the data control unit, a command analysis unit that analyzes the command transmitted from the master device, and a control unit. The control unit, when requested from the master device to return the result of the analysis in the command analysis unit, controls the clock control unit to make the master device stop the clock signal while the command analysis unit analyzes the command. The control unit also compares a value of the timer with the threshold value stored in the timer threshold value storage unit. If, as a result of the comparison, the value of the timer is equal to or less than the threshold value, the control unit saves transmit data in the transmission temporary storage unit, cancels the control by the clock control unit for stopping the clock signal, and has the data control unit transmit the data saved in the transmission temporary storage unit to the master device in synchronization with the clock signal received by the clock control unit. If, as a result of the comparison, the value of the timer exceeds the threshold value, the control unit cancels the control by the clock control unit for stopping the clock signal, places the clock control unit in a state to receive the clock signal, and places the data control unit in a state to receive a slave address indicating a communication device operating in the slave mode.

A communication method according to the invention is a communication method employed in a communication device operating in a slave mode, for receiving a command transmitted from a master device, which is a communication device operating in a master mode, by use of a synchronous serial communication bus including a clock signal line for transmitting a clock signal and a data signal line for transmitting data, analyzing the command, and returning a result of the analysis to the master device by use of the bus. The communication method includes the steps of: starting a timer when the master device starts communicating with the communication device operating in the slave mode; controlling a clock control unit to receive the clock signal from the master device via the clock signal line or stop the clock signal from the master device; having a data control unit transmit data to and receive data from the master device via the data signal line; temporarily saving the data transmitted by the data control unit in a transmission temporary data storage unit; and analyzing the command transmitted from the master device. When the master device requests return of a result of command analysis, control is performed to make the master device stop the clock signal while the command is analyzed. A value of the timer is compared with a threshold value prestored in a timer threshold value storage unit. If a result of the comparison is that the value of the timer is equal to or less than the threshold value, transmit data are saved in the transmission temporary data storage unit, the control for stopping the clock signal is cancelled, and the data saved in the transmission temporary storage unit are transmitted to the master device in synchronization with the clock signal received by the clock control unit. If the result of the comparison is that the value of the timer exceeds the threshold value, the control by the clock control unit for stopping the clock signal is cancelled, the clock control unit is placed in a state to receive the clock signal, and the data control unit is placed in a state to receive a slave address indicating a communication device operating in the slave mode.

Effects of the Invention

The communication device, communication method, and communication system according to the invention can reduce the time in which a synchronous serial communication bus consisting of a clock signal line and a data signal line is tied up, producing the effect of shortening the time during which other communication devices on the synchronous serial communication bus cannot communicate.

MODE FOR CARRYING OUT THE INVENTION

First Embodiment

Figure 1:
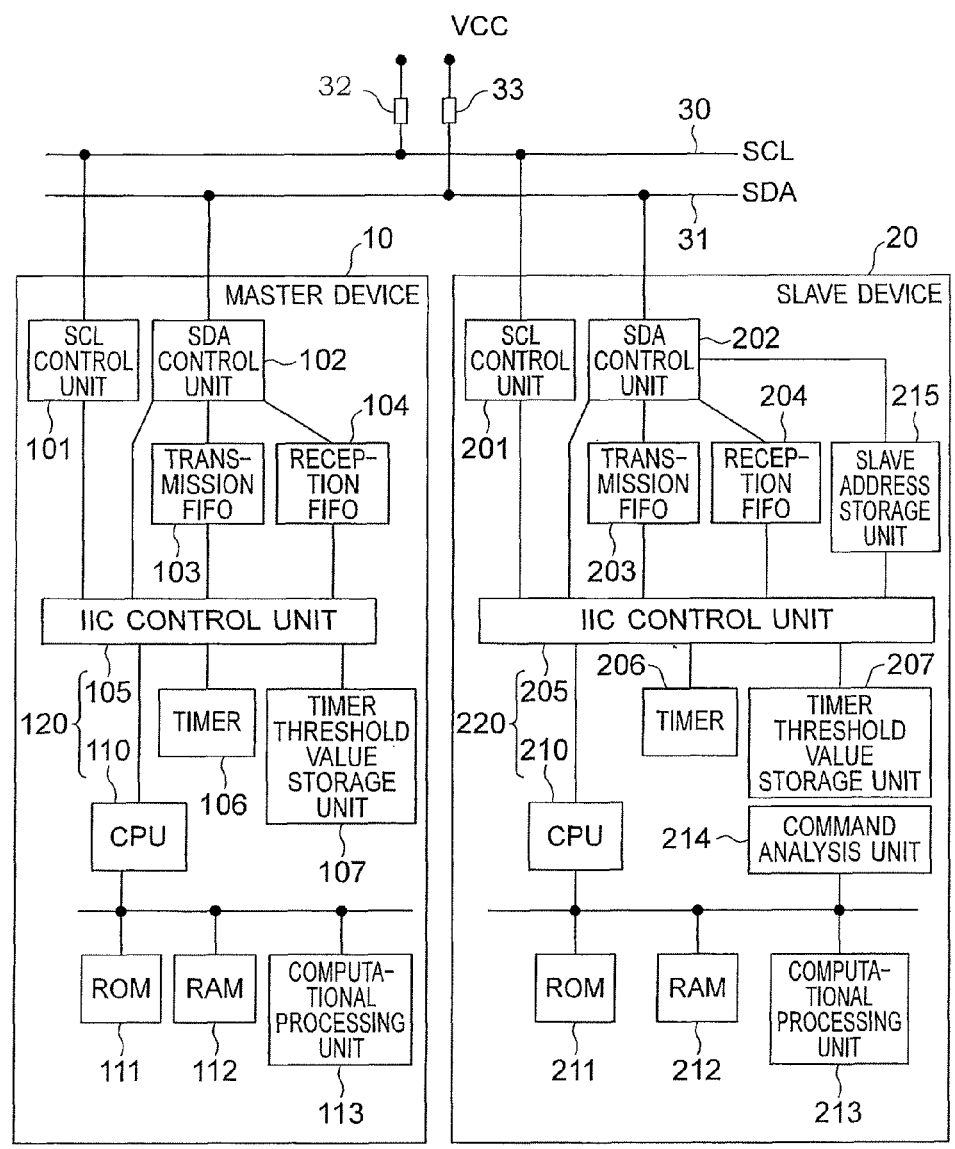
FIG. 1 is a block diagram schematically showing the configuration of a communication device and a communication system according to a first embodiment of the invention.

FIG. 1 is a block diagram schematically showing the configuration of a communication device and a communication system in the first embodiment of the invention. In FIG. 1, the communication system includes a master device 10 as a communication device operating in the master mode and a slave device 20 as a communication device operating in the slave mode. The master device 10 is a master device conforming to a synchronous serial communication protocol (the IIC protocol in this embodiment), and the slave device 20 is a slave device conforming to a synchronous serial communication protocol (the IIC protocol in this embodiment). The master device 10 and slave device 20 are connected to an SCL signal line 30 (the clock signal line in the synchronous serial communication protocol) for transmission of an SCL signal, which is an IIC clock signal, and an SDA signal line 31 (the data line in the synchronous serial communication protocol) for transmission of an SDA signal, which is an IIC data signal. The master device 10 and slave device 20 can communicate with each other by use of the SCL signal line 30 and SDA signal line 31. The SCL signal and SDA signal are open collector signals, so the SCL signal line 30 and SDA signal line 31 are pulled up to the power source voltage through resistors 32 and 33. A power source voltage of +3.3 V or +5 V is generally used, but other voltages may be used. FIG. 1 shows a case in which a single master device 10 and a single slave device 20 are connected to a single IIC bus (consisting of an SCL signal line and an SDA signal line), but plural master devices and plural slave device may be connected to a single IIC bus. The slave device, that is, communication device 20 shown in FIG. 1 is a device capable of implementing the communication method in the first embodiment.

The configuration of the master device 10 will now be described. As shown in FIG. 1, the master device 10 includes an SCL control unit 101 as a clock control unit, an SDA control unit 102 as a data control unit, a transmission FIFO 103 as a transmission temporary data storage unit, a reception FIFO 104 as a received temporary data storage unit, an IIC control unit 105 as a transmission and reception control unit, a timer 106, a timer threshold value storage unit 107, a CPU (central processing unit) 110, a read-only memory (ROM) 111, a random-access memory (RAM) 112, and a computational processing unit 113. In this application, the CPU 110 and IIC control unit 105 are also referred to collectively as the 'control unit' 120 of the master device 10.

The SCL control unit 101 performs high/low control of the SCL signal line (by driving it high or low) and reads the status of the SCL signal line 30 (to see whether it is in the high or low state). The SDA control unit 102 performs high/low control of the SDA signal (by driving it high or low) and reads the status of the SDA signal line 31 (to see whether it is in the high or low state).

When data are transmitted from the SDA control unit 102, the transmission FIFO 103 saves the data temporarily. The reception FIFO 104 temporarily saves data received by the SDA control unit 102.

The IIC control unit 105 controls the SCL control unit 101, SDA control unit 102, transmission FIFO 103, and reception FIFO 104. When IIC transmission and reception are performed, the IIC control unit 105 carries out communication by controlling these units. The timer threshold value storage unit 107 stores a threshold value for comparison with the value of the timer 106. The IIC control unit 105 controls the starting, stopping, and initialization of the timer 106 and refers to the threshold value stored in the timer threshold value storage unit 107.

The CPU 110 controls the master device 10. The CPU 110 controls the ROM 111 in which programs are stored, the RAM 112 used for executing the programs, and the computational processing unit 113 that performs computational processes, as well as controlling the operation of the master device 10. The CPU 110 executes the programs stored in the ROM 111 by use of the RAM 112, and controls the IIC control unit 105 to write data onto the IIC bus and read data from the IIC bus. The computational processing unit 113 executes, for example, graphics processing, the encoding and decoding of compressed video signals, and other such processing.

Next, the configuration of the slave device 20 will be described. As shown in FIG. 1, the slave device 20 includes an SCL control unit 201 as a clock control unit, an SDA control unit 202 as a data control unit, a transmission FIFO 203 as a transmission temporary data storage unit, a reception FIFO 204 as a received temporary data storage unit, an IIC control unit 205 as a transmission and reception control unit, a timer 206, a timer threshold value storage unit 207, a CPU 210, a ROM 211, a RAM 212, a computational processing unit 213, a command analysis unit 214, and a slave address storage unit 215. In this application, the CPU 210 and IIC control unit 205 are also referred to collectively as the 'control section' 220 of the slave device 20.

The SCL control unit 201 performs high/low control of the SCL signal line (control to drive the line high or low) and reads the status of the SCL signal line 30 (to see whether it is in the high or low state). The SDA control unit 202 performs high/low control of the SDA signal (control to drive the signal high or low) and reads the status of the SDA signal line 31 (to see whether it is in the high or low state).

When data are transmitted from the SDA control unit 202, the transmission FIFO 203 saves the data temporarily. The reception FIFO 204 temporarily saves data received by the SDA control unit 202. The slave address storage unit 215 stores the address (referred to as the slave address) of the slave device 20. When the SDA control unit 202 receives a slave address transmitted from the master device 10, it determines whether the received slave address matches the slave address stored in the slave address storage unit 215.

The IIC control unit 205 controls the SCL control unit 201, SDA control unit 202, transmission FIFO 203, and reception FIFO 204. When IIC transmission and reception are performed, the IIC control unit 205 carries out communication by controlling these units. The timer threshold value storage unit 207 stores a threshold value for comparison with the value of the timer 206 (a value corresponding to the elapsed time from the start of operation of the timer). The IIC control unit 205 starts, stops, and initializes the operation of the timer 206 and refers to the threshold value stored in the timer threshold value storage unit 207.

The CPU 210 controls the slave device 20. Besides controlling the slave device 20, the CPU 210 controls the ROM 211 in which programs are stored, the RAM 212 used for executing the programs, and the computational processing unit 213 that performs computational processes. The CPU 210 executes the programs stored in the ROM 211 by use of the RAM 212 and controls the IIC control unit 205, thereby writing data onto the IIC bus and reading data from the IIC bus. The computational processing unit 213 executes, for example, graphics processing, the encoding and decoding of compressed video signals, and other such processing.

The command analysis unit 214 analyzes commands transmitted from the master device 10 to the slave device 20, and, as the result of the analysis, returns OK data (data indicating that the command has correctly been interpreted) or NG data (data indicating that command interpretation has failed).

The operation of the master device 10 and slave device 20 will now be described. The master device 10 transmits, for example, a command consisting of three-byte data (the master device 10 performs a write process); the slave device 20 receives the command, interprets the content of the command, returns OK data if it has correctly interpreted the command, and returns NG data if command interpretation fails (the master device 10 performs a read process).

Figure 2:
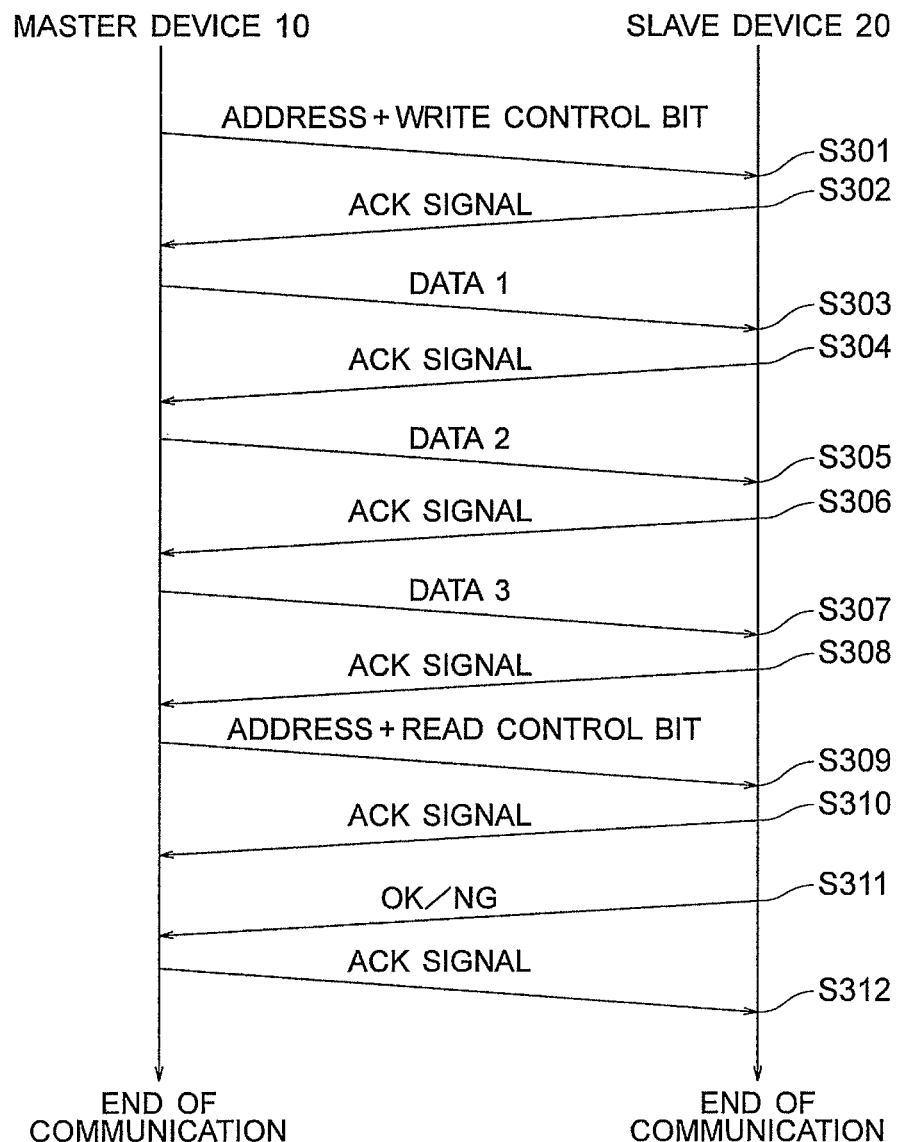
FIG. 2 is a diagram illustrating IIC communication between a master device and a slave device in the first embodiment.

FIG. 2 is a diagram showing a flow of IIC communication between the master device 10 and slave device 20 in the first embodiment. First, the master device 10 transmits eight-bit data including the seven-bit slave address of the slave device 20 and a bit (also referred to as a 'write control bit') indicating that it is performing write control to the slave device 20 (step S301). In the IIC protocol, when a device operating as a communication device receives a slave address matching its own address, in order to operate as a slave device, it returns an ACK (ACKnowlegement) signal (step S302).

Next, the master device 10 transmits eight-bit data 1 (step S303), and the slave device 20, if it receives the eight-bit data correctly, returns an ACK signal (step S304). Similarly, the master device 10 transmits data 2, receives an ACK signal from the slave device 20, transmits further data 3, and receives an ACK signal from the slave device 20 (steps S305 to S308). The above processing completes the transmission of a command in a write process from the master device 10 to the slave device 20.

Next, the master device 10, in order to perform a read process to check the response from the slave device 20 to the command transmitted in the preceding write process, again sends the slave device eight-bit data including the seven-bit slave address of the slave device 20 and a bit (also referred to as a 'read control bit') indicating that read control will be performed (step S309).

In response, the slave device 20 returns an ACK signal because the received address matches its own address (step S310), and also transmits OK data or NG data to the master device 10 (step S311). This process is a read process in which the master device 10 reads data from the slave device 20. For example, the slave device 20 returns OK data as "0x05" and NG data as "0xA0". The master device 10 receives "0x05" as OK data or "0xA0" as NG data and returns an ACK signal to the slave device 20, terminating the communication process (step S312).

Figure 3A:
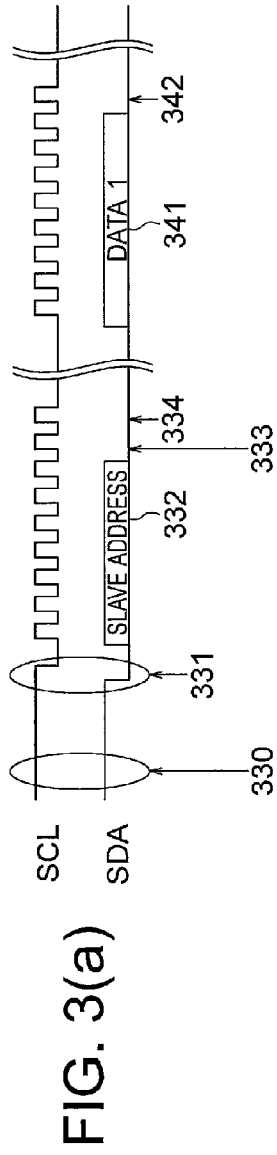
FIGS. 3(*a*) to 3(*c*) are timing diagrams showing exemplary waveforms in the IIC communication in FIG. 2.
Figure 3B:
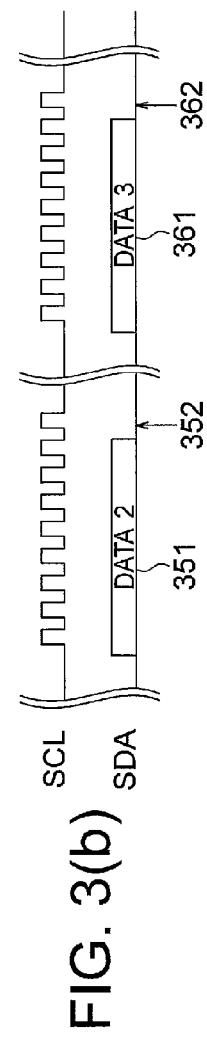
Figure 3C:
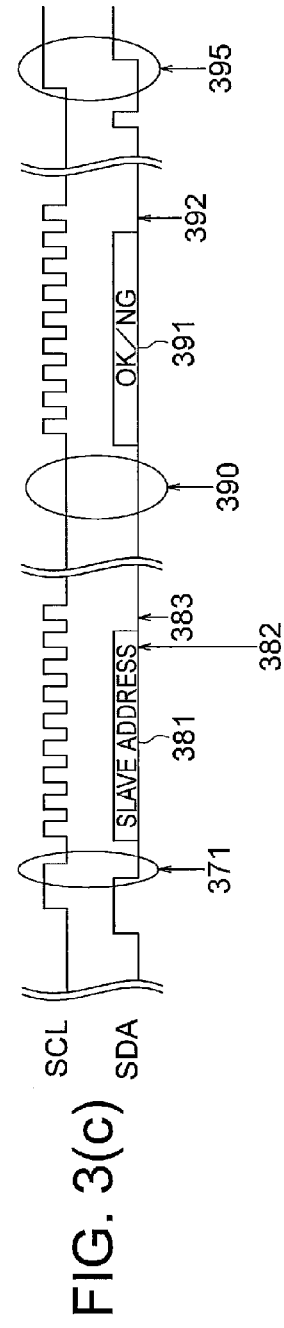

FIGS. 3(*a*) to 3(*c*) are timing diagrams showing exemplary waveforms in the IIC communication in FIG. 2. FIG. 3(*a*) corresponds to steps S301 to S304 in FIG. 2; FIG. 3(*b*) corresponds to steps S305 to S308 in FIG. 2; FIG. 3(*c*) corresponds to steps S309 to S312. In the initial IIC state in FIGS. 3(*a*) to 3(*c*), the SCL signal line 30 and SDA signal line 31 are both in the high state (state 330 in FIG. 3(*a*)). In the master device 10, in order to perform a write process, first the SCL control unit 101 and SDA control unit 102 check the states of the SCL signal line 30 and SDA signal line 31, respectively, and confirm that no device is accessing the IIC bus at this time.

Then the SDA control unit 102 drives the SDA signal line 31 low, and the SCL control unit 101 drives the SCL signal line 30 low. This sets a start condition (331 in FIG. 3(*a*)) on the IIC bus. After that, the SCL control unit 101 performs high/low control of the SCL signal line 30 to supply a clock waveform, and the SDA control unit 102 transmits seven-bit data (332 in FIG. 3(*a*)) indicating the slave address of the communication partner device in synchronization with the control of the SCL signal line 30. The master device 10 also transmits a write control bit (low signal 333 in FIG. 3(*a*)). When the SCL signal line 30 next goes high, the slave device 20 with the matching slave address returns an ACK signal (334 in FIG. 3(*a*)). In the example in FIG. 3(*a*), the ACK signal is a low signal.

Since IIC signals are pulled-up open collector signals, when there is no device (communication device) with a slave address matching the slave address transmitted by the master device 10, no device drives the SDA signal line 31 low, so the SDA signal line 31 goes high. If there is a device (e.g., slave device 20) with an address matching the slave address, this device drives the SDA signal line 31 low, so the master device 10 can confirm that slave device 20 is present on the IIC bus. The slave device 20 transmits an ACK signal (by driving the SDA signal line 31 low) when the SDA control unit 202 receives a slave address from the master device 10 and the received slave address matches the slave address stored in the slave address storage unit 215; if they do not match, the slave device 20 does not transmit anything (does nothing to the SDA signal line 31).

Next, as a write process, the master device 10 transmits data 1 (341 in FIG. 3(*a*)), and upon receiving data 1, the slave device 20 returns an ACK signal (342 in FIG. 3(*a*)). Next the master device 10 transmits data 2 (351 in FIG. 3(*b*)) and the slave device 20 returns an ACK signal (352 in FIG. 3(*b*)); then the master device 10 transmits data 3 (361 in FIG. 3(*b*)) and the slave device 20 returns an ACK signal (362 in FIG. 3(*b*)). Data transmission from the master device 10 ends here and the master device 10 now generates a start condition (371 in FIG. 3(*c*), also referred to as a 'restart condition') in order to perform a read process to receive OK data or NG data in response from the slave device 20.

Then the master device 10 again transmits seven-bit data indicating the slave address (381 in FIG. 3(*c*)), and now transmits a read control bit (high-level signal 382 in FIG. 3(*c*)). Because the address matches its own address, the slave device 20 returns a low signal as an ACK signal (383 in FIG. 3(*c*)).

Next, while the IIC bus is in the wait state (390 in FIG. 3(*c*)), the slave device 20 interprets the command consisting of the data 1, data 2, and data 3 that have been transmitted from the master device 10, and returns OK data or NG data ("0x05" or "0xA0") to the master device 10 (391 in FIG. 3(*c*)). The master device 10 receives the OK data or NG data and returns an ACK signal (392 in FIG. 3(*c*)) to the slave device 20.

Subsequently the master device 10 first drives the SDA signal line 31 low, then drives both the SCL signal line 30 and SDA signal line 31 high to generate a stop condition (395 in FIG. 3(*c*)) terminating IIC communication. The SCL signal line 30 is generally controlled by the SCL control unit 101 in the master device 10, but when the slave device 20 is not ready to transmit data, the SCL control unit 201 in the slave device 20 drives the SCL signal line 30 low. At this time, the SCL control unit 101 in the master device 10 can recognize that it will be unable to perform high/low control of the SCL signal line 30, and the master device 10 can recognize that the slave device 20 is in a wait state. The wait state 390 in FIG. 3(*c*) may sometimes be entered when the slave device 20 drives the SCL signal line 30.

As described above, the processing in which the master device 10 transmits a command in a write process, issues a restart condition, and then checks the response to the command by the slave device 20 in a read process can be performed as a series of IIC communication processes, so the communication session becomes clear and the slave device 20 can reliably return a response of OK or NG data to the command transmitted by the master device 10.

The IIC protocol allows the read and write processes to be used independently, but in the first embodiment, in order for the slave device 20 to respond reliably to commands transmitted by the master device 10, the read and write processes are used in combination.

Figure 4:
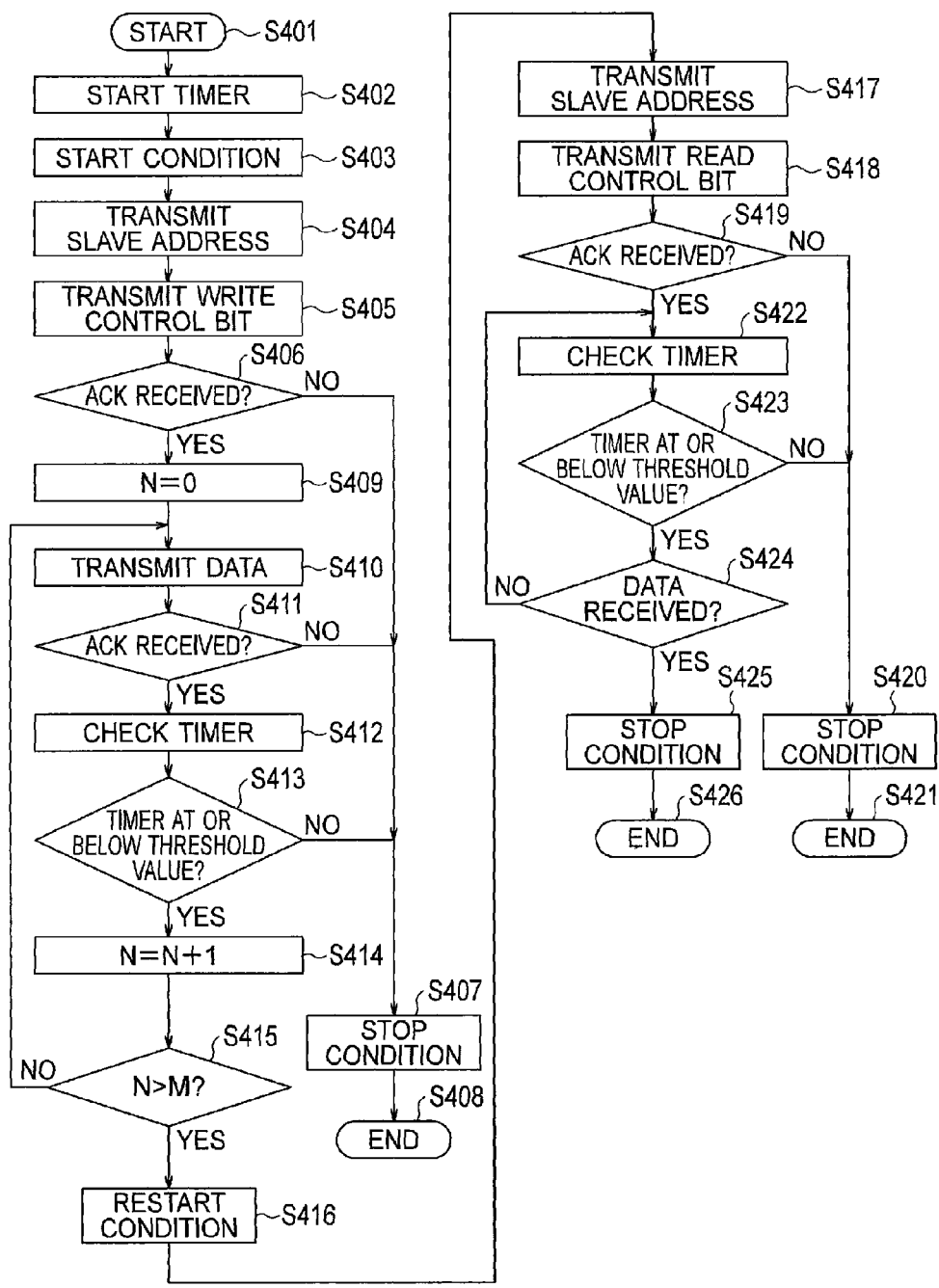
FIG. 4 is a flowchart illustrating processing performed by the master device in the first embodiment.
Figure 5:
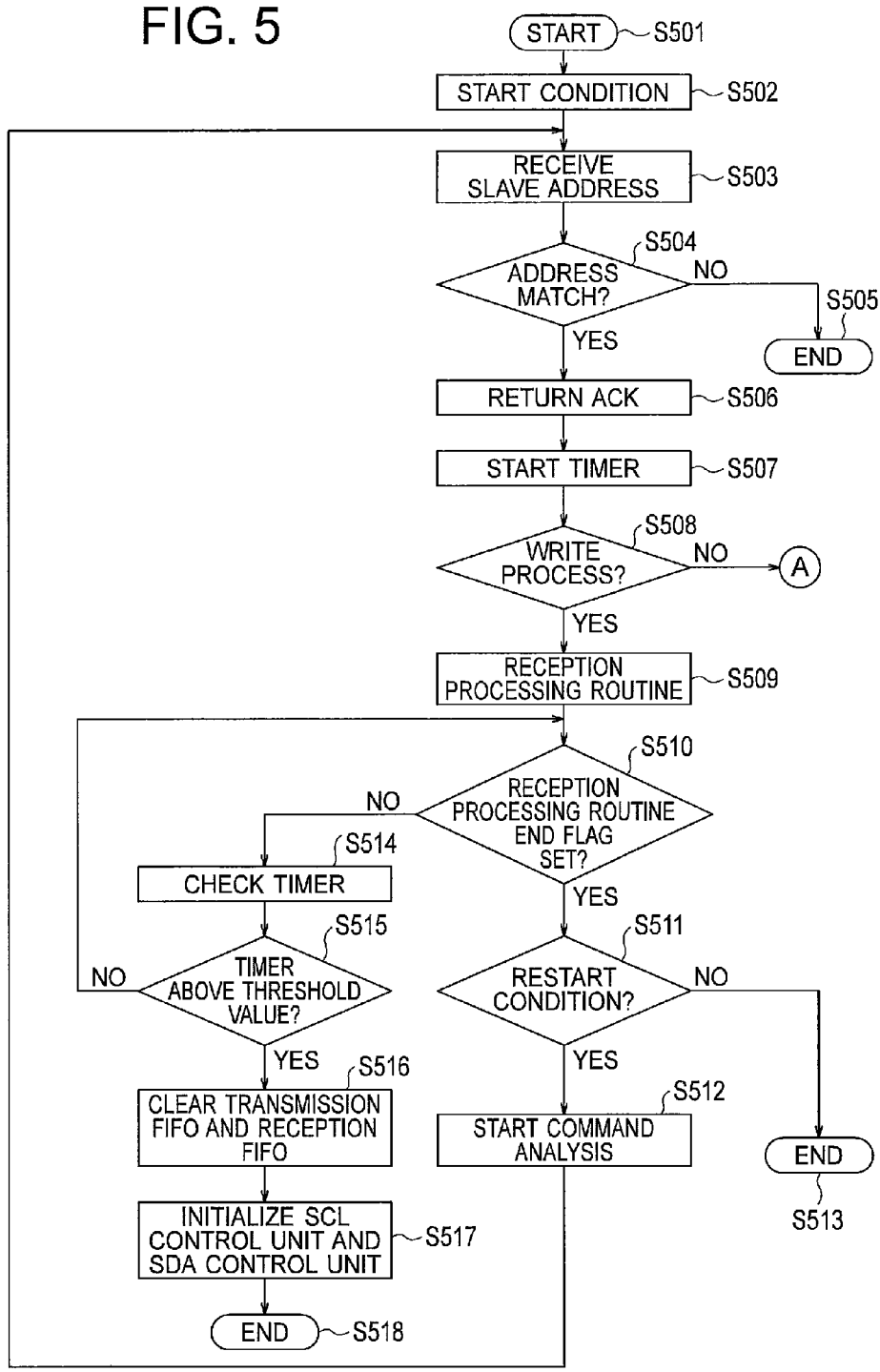
FIG. 5 is a flowchart (part 1) illustrating processing performed by the slave device in the first embodiment.
Figure 6:
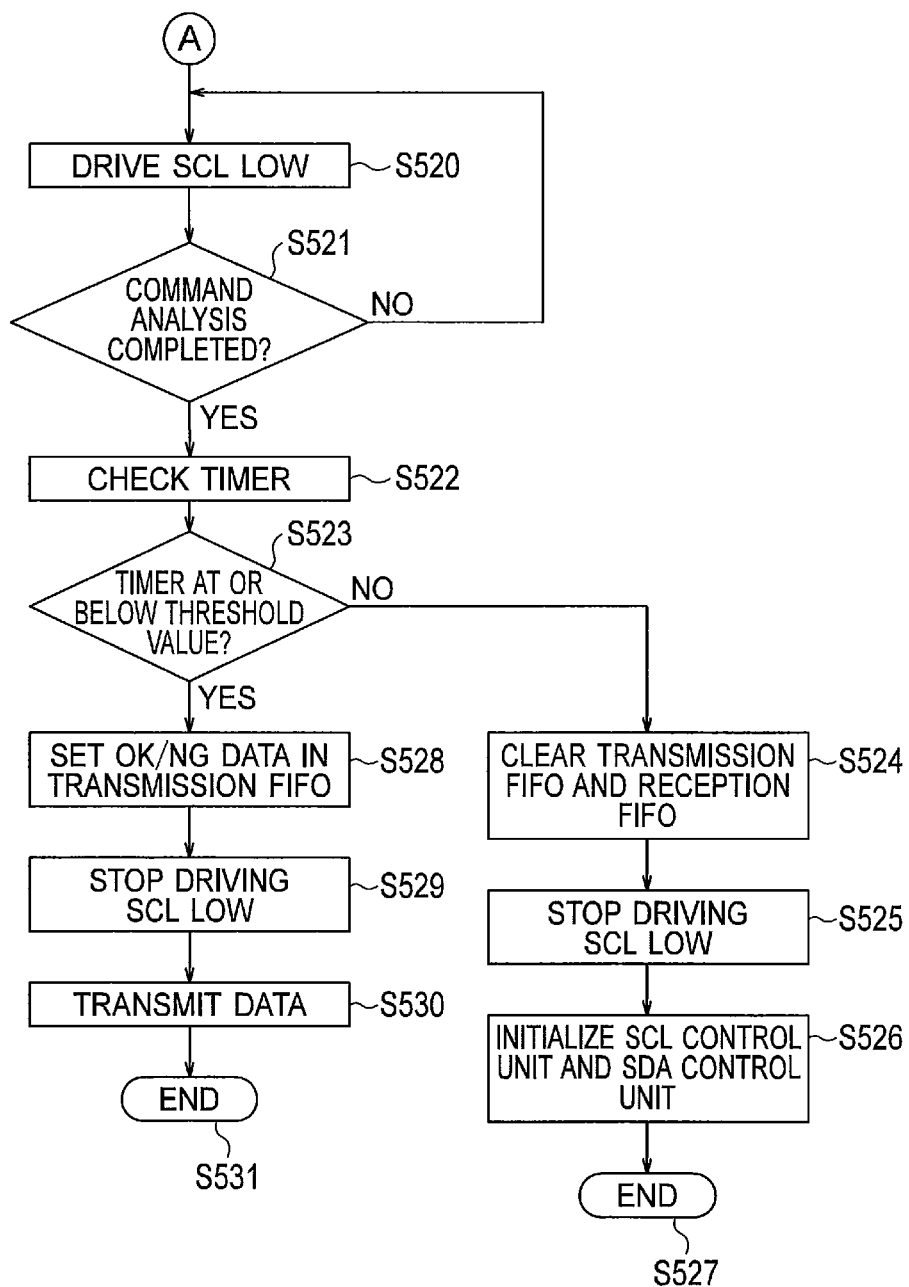
FIG. 6 is a flowchart (part 2) illustrating processing performed by the slave device in the first embodiment.
Figure 7:
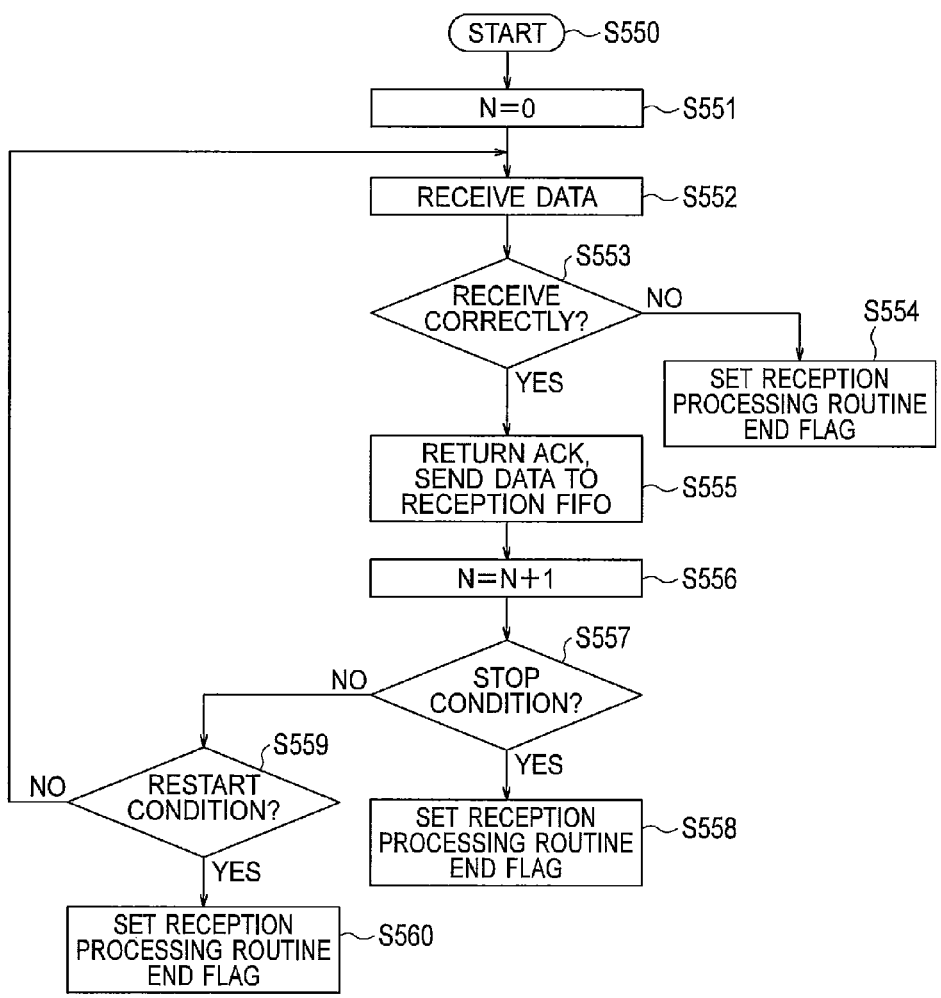
FIG. 7 is a flowchart illustrating the content of the reception processing routine in FIG. 5.

An IIC communication sequence performed by the master device 10 will now be described with reference to FIGS. 1, 4, 5, 6, and 7. The CPU 110 in the master device 10 in FIG. 1 executes IIC communication processing on the basis of a program recorded in ROM 111. FIG. 4 is a flowchart illustrating a process performed by the master device 10 in the first embodiment. FIGS. 5 and 6 constitute a flowchart illustrating a process performed by the slave device 20 in the first embodiment; they illustrate a process in which CPU 210 performs the above IIC communication processing on the basis of a program recorded in ROM 211. FIG. 7 is a flowchart illustrating the content of the reception processing routine in FIG. 5.

As shown in FIG. 4, first, when CPU 110 starts the process (step S401), on the basis of the program in ROM 111, it instructs IIC control unit 105 to start timer 106 (step S402). Next, CPU 110 instructs IIC control unit 105 to generate a start condition; IIC control unit 105 controls SCL control unit 101 and SDA control unit 102, confirms that the IIC bus is free, and generates the start condition (step S403).

Next, CPU 110 transmits a slave address to IIC control unit 105 (step S404) and issues an instruction to IIC control unit 105 to transmit a write control bit indicating that the master device 10 will perform write processing (step S405). IIC control unit 105 writes eight-bit data consisting of the slave address and write control bit into transmission FIFO 103. Then SCL control unit 101 reads the data from transmission FIFO 103 and controls the SDA signal line 31 in synchronization with the control of the SCL signal line 30 by SCL control unit 101, thereby transmitting the slave address and write control bit.

Next, CPU 110 controls IIC control unit 105 and checks whether an ACK signal has been received or not (step S406); if no ACK signal has been received, it generates a stop condition (step S407), thereby terminating IIC communication (step S408). If an ACK signal has been received, CPU 110 sets N=0 (step S409) and writes data into IIC control unit 105, IIC control unit 105 sends the data to transmission FIFO 103, and SDA control unit 102 reads the data from transmission FIFO 103 and transmits the data in synchronization with the control of the SCL signal line 30 by SCL control unit 101 (step S410).

Then CPU 110 controls IIC control unit 105 and checks whether an ACK signal has been received or not (step S411); if no ACK signal has been received, it generates a stop condition (step S407) and terminates IIC communication (step S408). If an ACK signal has been received, CPU 110 controls IIC control unit 105 and checks timer 106 (step S412) to see whether the value of timer 106 is equal to or greater than the threshold value prestored in the timer threshold value storage unit 107 (step S413). The threshold value is preferably a time long enough to complete the IIC communication and short enough that other users of the communication system are not affected by non-completion of the IIC communication. If the value of timer 106 exceeds the threshold value in the timer threshold value storage unit 107, CPU 110 controls IIC control unit 105, decides that something has gone wrong in communication on the IIC bus or processing in the slave device 20 and that this will affect the system, has SCL control unit 101 and SDA control unit 102 issue a stop condition (step S407), and terminates IIC communication (step S408).

Next, CPU 110 sets N=N+1 (step S414) and checks whether N>M or not (step S415); if N<M, it returns to step S410 and transmits data again. In the first embodiment, M=3. If N>M in step S415, CPU 110 instructs the IIC control unit 105 to issue a start condition in order to perform a read process, and IIC control unit 105 controls SCL control unit 101 and SDA control unit 102 to generate another start condition (also referred to as a 'restart condition') (step S416).

Then CPU 110 issues an instruction to IIC control unit 105 to transmit the slave address (step S417) and a read control bit indicating that the master device 10 will perform a read process (step S418). TIC control unit 105 writes eight-bit data consisting of the slave address and the read control bit into transmission FIFO 103. Then SDA control unit reads the data from transmission FIFO 103 and transmits the slave address and read control bit by controlling the SDA signal line 31 in synchronization with the control of the SCL signal line 30 by SCL control unit 101.

Next, by controlling IIC control unit 105, CPU 110 checks whether or not an ACK signal has been received (step S419) and, if no ACK signal has been received, has SCL control unit 101 and SDA control unit 102 generate a stop condition (step S420) to terminate IIC communication (step S421). If an ACK signal has been received in step S419, CPU 110 controls IIC control unit 105 and checks the value of timer 106 (step S422) to see whether or not the value of timer 106 is equal to or less than the threshold value prestored in the timer threshold value storage unit 107 (step S423). If the value of timer 106 exceeds the threshold value, CPU 110 decides that something that will affect the communication system has gone wrong in the processing in the slave device 20, controls IIC control unit 105, and has SCL control unit 101 and SDA control unit 102 issue a stop condition (step S420), thereby terminating IIC communication (step S421).

If the value of timer 106 does not exceed the threshold value, CPU 110 controls IIC control unit 105 and checks whether data have been received or not (step S424). In receiving the data, SCL control unit 101 performs clock control, and SDA control unit 102 receives the data in synchronization with the high and low states of the SCL signal line 30 and writes the data into reception FIFO 104. CPU 110 controls IIC control unit 105 and detects that data have been written into reception FIFO 104. CPU 110 reads the data from reception FIFO 104 via IIC control unit 105. The data in reception FIFO 104 are either 'OK' data ("0x05") indicating that the transmitted command was correctly interpreted or 'NG' data ("0xA0") indicating that it was not correctly interpreted. If data have not been received, CPU 110 returns to step S422.

Upon reception of data, CPU 110 controls TIC control unit 105, thereby controlling SCL control unit 101 and SDA control unit 102 to generate a stop condition (step S425) and terminating IIC communication (step S426).

Next, the processing in the slave device 20 when CPU 210 performs the above IIC communication on the basis of the program recorded in ROM 211 will be described with reference to FIGS. 5 and 6. The content of the reception processing routine (step S509) in FIG. 5 is shown in FIG. 7. The slave device 20 must be constantly in a receivable state since it cannot tell when it will be accessed from the master device 10. The CPU 210 in the slave device 20 prestores the slave address in the slave address storage unit 215 via IIC control unit 205 and SDA control unit 202. IIC communication starts (step S501) when SCL control unit 201 and SDA control unit 202 receive signal transitions (transitions of the SCL signal line 30 and SDA signal line 31 to the high or low state) from the master device 10. The data the master device 10 transmits first after setting a start condition on the IIC bus include a slave address and a write control bit or a read control bit, so SDA control unit 202 detects the start condition (step S50) and receives the slave address (step S503). IIC control unit 205 compares the received slave address with the slave address stored in the slave address storage unit 215 and decides whether or not they match (step S504). If they do not match, IIC control unit 205 terminates IIC communication (step S505).

If the received slave address matches the slave address stored in the slave address storage unit 215, CPU 210 controls IIC control unit 205, returns an ACK signal (step S506), and starts timer 206 (step S507). Here timer 206 is first set to an initial value (initialized) and then starts operating (e.g., incrementing the value to indicate elapsed time).

Next, CPU 210 controls IIC control unit 205 and determines whether the bit transmitted together with the slave address is a write control bit or a read control bit (step S508). When the write control bit is set, a write process from the master device 10 to the slave device 20 will take place; when the read control bit is set, a process in which the master device 10 reads data from the slave device 20 will be performed.

In a write process, CPU 210 controls IIC control unit 205 and executes a reception processing routine (step S509). In the reception processing routine, the processing starts in step S550 in FIG. 7, and N is set to 0 (step S551). CPU 210 then controls IIC control unit 205, receives data (step S552), and checks whether the data have been correctly received or not (step S552); if the data have not been correctly received, it sets a reception processing routine end flag (step S554). If the data have been correctly received, CPU 210 controls IIC control unit 205, returns an ACK signal, sends the data to reception FIFO 204 (step S555), and sets N=N+1 (step S556). In FIG. 7, N equals the number of bytes of received data.

CPU 210 sequentially transfers the data in reception FIFO 204 via IIC control unit 205 to RAM 212; when CPU 210 is doing other processing and cannot read data from IIC control unit 205, IIC control unit 205 can control SCL control unit 201 so as to drive the SCL signal line 30 low, thereby stopping the high/low control of the SCL signal line 30 (the clock operation of the SCL signal line 30) performed by SCL control unit 101 in the master device 10. When the data in reception FIFO 204 have been copied into RAM 212 by CPU 210 and accordingly reception FIFO 204 has free capacity, IIC control unit 205 cancels the low control of the SCL signal line 30 and resumes the receiving operation.

Next, after reception has been properly terminated, CPU 210 controls IIC control unit 205 and checks whether a stop condition has been set on the IIC bus (step S557). If reception has been properly terminated and a stop condition has been set on the IIC bus, CPU 210 sets a reception processing routine end flag (step S558). If reception has not been properly terminated and a stop condition has not been set on the IIC bus, CPU 210 checks whether a restart condition has been set on the IIC bus (step S559). If there is a restart condition on the IIC bus, CPU 210 sets the reception processing routine end flag and terminates the reception processing routine (step S560). If there is not a restart condition on the IIC bus, CPU 210 returns to step S52 to receive data.

While controlling IIC control unit 205 to execute the reception processing routine, CPU 210 checks whether the reception processing routine end flag is set. If the reception processing routine end flag is set, CPU 210 controls IIC control unit 205 and once more checks whether or not a restart condition has occurred on the IIC bus (step S511); if a restart condition has occurred on the IIC bus, CPU 210 controls IIC control unit 205, causes the command analysis unit 214 to start analysis of the command consisting of the received data (step S512), and returns to the slave address receiving step (step S503).

CPU 210 reads the data transmitted from the master device 10 and stored in reception FIFO 204 via IIC control unit 205, and has the command analysis unit 214 execute a command analysis on the data. In the command analysis, the N counted in the preceding reception processing routine (step S509) is the number of received bytes, so the command analysis unit 214 can decide whether or not something is wrong with the number of the received data bytes by, for example, comparing N with a parameter provided in the data transmitted by and received from the master device 10 designating the number of transmitted bytes.

The command analysis is executed by the command analysis unit 214, but when computational processing unit 213 in the slave device 20 is heavily loaded, for example, the processing in the command analysis unit 214 can take time.

CPU 210 checks whether the reception processing routine end flag is set in step S510, and if the flag is not set, it performs a check of the value of timer 206 (step S514). CPU 210 controls IIC control unit 205 and checks whether the value of timer 206 exceeds the threshold value prestored in timer threshold value storage unit 207 (step S515). The threshold value is preferably a time long enough to complete the IIC communication and short enough that other users of the communication system are not affected by non-completion of the IIC communication.

If the value of timer 206 exceeds the threshold value, CPU 210 decides that something that will affect the system has gone wrong in the write processing by the master device 10, controls IIC control unit 205, clears transmission FIFO 203 and reception FIFO 204 (step S516), initializes SCL control unit 201 and SDA control unit 202 (step S517), and terminates IIC communication (step S518). In other words, if the value of timer 206 exceeds the threshold value, CPU 210 controls IIC control unit 205, clears transmission FIFO 203 and reception FIFO 204 (step S516), cancels the control by SCL control unit 201 that has stopped the clock signal, and places SCL control unit 201 in a state to receive the clock signal (a clock receivable state) and SDA control unit 202 in a state to receive a slave address indicating a communication device operating in the slave mode (a slave address receivable state).

If the value of timer 206 does not exceed the threshold value in step S514, CPU 210 controls IIC control unit 205 and returns to step S510 to check whether the reception processing routine end flag is set and whether the reception processing routine has ended.

As described above, the slave device 20 handles a write process from the master device 10 either by starting command analysis (step S512) and, if a restart condition has occurred, returning to step S503 or, when the value of timer 206 exceeds the threshold value, by clearing transmission FIFO 203 and reception FIFO 204 (step S516), initializing SCL control unit 201 and SDA control unit 202 (step S517), and then terminating the process (step S518).

After executing the termination step (step S518), the slave device 20 does not know when the next start condition will be transmitted from the master device 10, so it starts processing from step S501 and checks to see when the IIC bus comes into the start condition.

Next, the operation of the slave device 20 when the master device 10 sets a read control bit will be described. The first embodiment will show an example in which, in order for the slave device 20 to respond to a command transmitted by the master device 10, write processing by the master device is followed by a restart condition, and then by read processing.

First, SCL control unit 201 and SDA control unit 202 receive signals (high or low transitions of the SCL signal line 30 and SDA signal line 31) from the master device 10. The data the master device 10 transmits after setting a start condition or a restart condition on the IIC bus include the slave address and a read control bit, so SDA control unit 202 detects the start condition or restart condition (step S502) and receives the slave address (step S503). If write processing has already been performed, the restart condition was detected in step S559 of the reception processing routine or in step S511, so CPU 210 proceeds with the process from the reception of the slave address (step S503).

CPU 210 compares the received slave address and the slave address stored in the slave address storage unit 215 to see whether they match (step S504). If they do not match, CPU 210 terminates communication processing (step S505). If the slave addresses match, CPU 210 controls IIC control unit 205, returns an ACK signal (step S506), and starts timer 206 (step S507). If timer 206 has not yet been started, it is first initialized and then started here. Since read processing is executed from a restart condition in this embodiment, write processing has already been performed and timer 206 has already been started, so it is not restarted here.

Next, CPU 210 decides whether the data transmitted together with the slave address is a write control bit or a read control bit (step S508). A read control bit is set here, so CPU 210 starts preparing to transmit data to the master device 10, but it cannot decide whether to transmit OK or NG data until the preceding command analysis process has been performed in the slave device and the analysis process has ended. Accordingly, CPU 210 first controls IIC control unit 205 and drives the SCL signal line 30 low, thereby stopping high/low control of the SCL signal line 30 by SCL control unit 101 in the master device 10, that is, stopping the process that toggles the IIC clock signal (step S520).

Next, CPU 210 checks whether the command analysis is completed or not (step S521), and if it is not completed, returns to step S520. If the command analysis is completed, CPU 210 decides whether to transmit OK or NG data, and then performs a check of the value of timer 206 (step S522). CPU 210 checks whether the value of timer 206 is equal to or less than the threshold value prestored in timer threshold value storage unit 207 (step S523). The threshold value is preferably a time long enough to complete the IIC communication and short enough that other users of the communication system are not affected by non-completion of the IIC communication.

If the value of timer 206 exceeds the threshold value, the command analysis process may have taken too much time, and since the master device 10 has also checked time taken by the read process with timer 106 (step S418 in FIG. 4), if the respective threshold values are the same, the master device 10 will have terminated the IIC communication. Accordingly, when the value of timer 206 exceeds the threshold value, CPU 210 controls IIC control unit 205 and clears the data in transmission FIFO 203 and reception FIFO 204 (step S524), ends the state of SCL control unit 201 that has kept the SCL signal line 30 driven low (step S525), places SCL control unit 201 and SDA control unit 202 in their initial states (initializes them) (step S526), and terminates processing (step S527).

If the threshold value has not been exceeded in step S523, CPU 210 controls IIC control unit 205, sends the result (OK or NG data) of the command analysis to transmission FIFO 203 (step S528), and cancels the low driving by SCL control unit 201 (step S529); SCL control unit 101 in the master device 10 performs control for driving the SCL signal line 30 high or low, SCL control unit 201 in the slave device 20 accordingly detects a changes on the SCL signal line 30, and then, in synchronization therewith, SDA control unit 202 transmits the data in transmission FIFO 203 onto the SDA signal line 31, whereby data transmission from the slave device 20 to the master device is performed (step S530). The process ends when the data transmission is completed (step S531).

After executing the termination process (step S527 or S531), the slave device 20 does not know when the next start condition will be transmitted from the master device 10, so it starts processing from step S501. The master device 10 is configured such that if the slave device 20 returns NG data in response to a command transmitted from the master device 10, the master device 10 transmits the same command to the slave device 20 again. This scheme assures reliable transmission of the command from the master device 10 to the slave device 20.

This scheme also provides an immediate check on whether a command transmitted from the master device 10 to the slave device 20 was correctly interpreted in the slave device 20. Even if the master device 10 terminates the IIC communication process in mid-flow because it receives no response from the slave device 20 for more than a predetermined time, since the slave device 20 can recognize that it could not respond within the predetermined time, it is possible to terminate access to the IIC bus (in the first embodiment, to stop driving the SCL signal line 30 low, or to initialize the states of SCL control unit 201 and SDA control unit 202), thereby preventing the SCL signal line 30 or SDA signal line 31 of the IIC bus from being left driven low.

When a problem occurs in the course of processing in the slave device 20, because SCL control unit 201, SDA control unit 202, transmission FIFO 203, and reception FIFO 204 are initialized, there is no need to reset all the processes running in the slave device 20, and the problem has no effect on other processes being executed by CPU 210.

Even if a transmission problem occurs in the master device 10, when the timer value exceeds the threshold value, the master device 10 and slave device 20 can each terminate only those processes related to IIC communication, so it is possible to proceed with non-IIC processing in the master device and slave device without having the problem affect the non-IIC processing in the master device and slave device.

Identical threshold values are preferably stored in the timer threshold value storage unit 107 in the master device 10 and the timer threshold value storage unit 207 in the slave device 20. The reason is that if the threshold values are set to the same value, then regardless of whether the problem occurs in the master device 10 or the slave device 20, IIC communication is terminated at the same timing on the basis of the respective timer values, enabling IIC communication downtime to be minimized.

Second Embodiment

Figure 8:
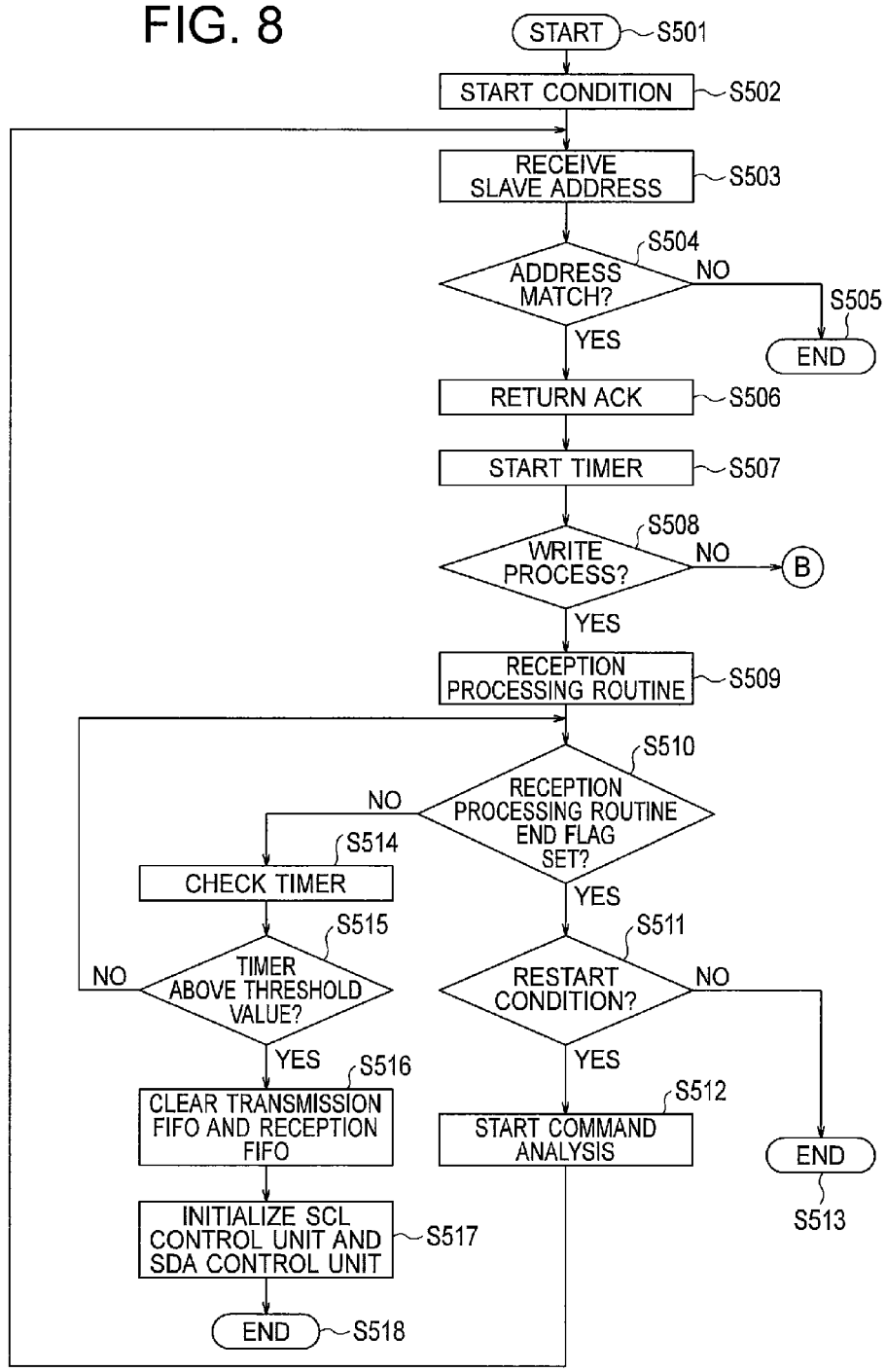
FIG. 8 is a flowchart (part 1) illustrating processing performed by the slave device in a second embodiment of the invention.
Figure 9:
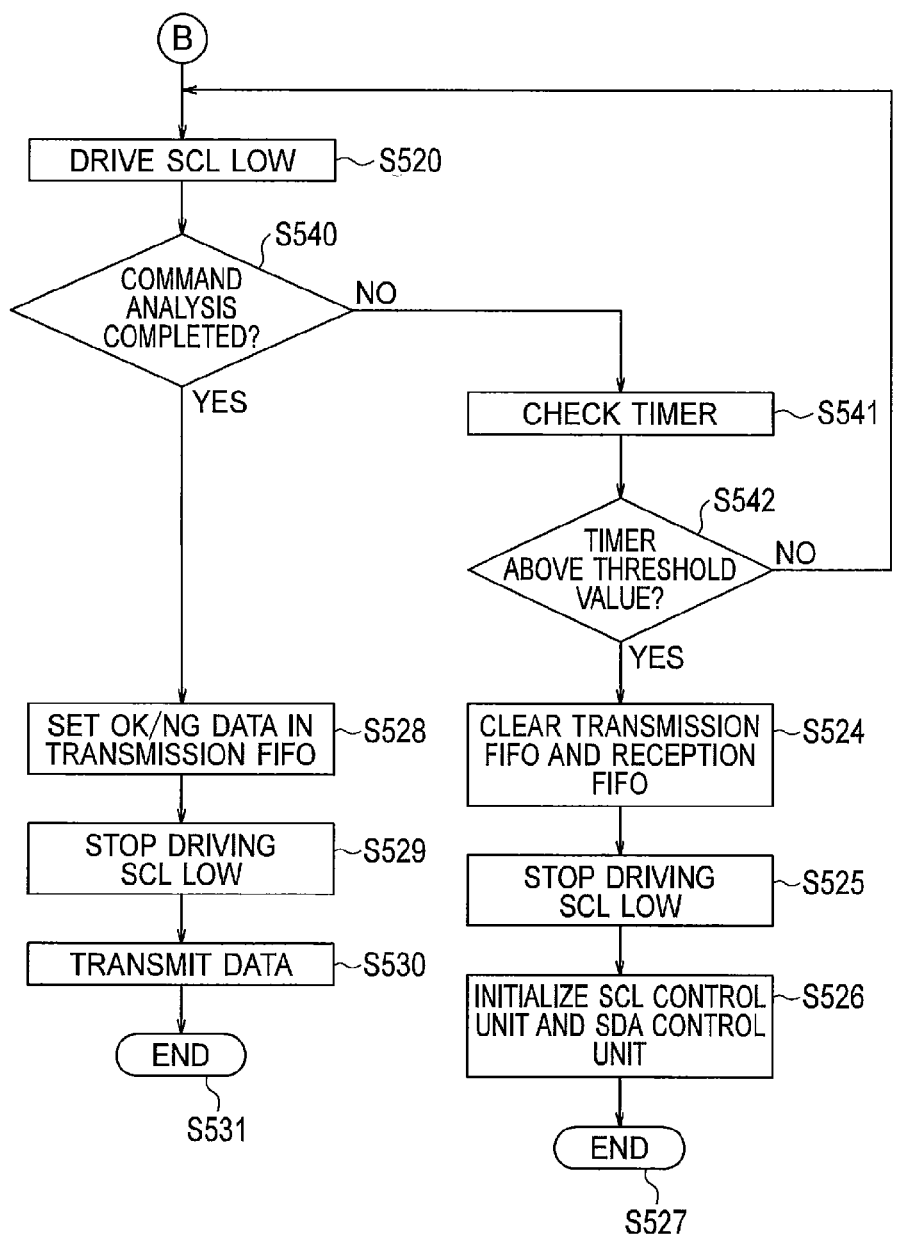
FIG. 9 is a flowchart (part 2) illustrating processing performed by the slave device in the second embodiment of the invention.

FIGS. 8 and 9 constitute a flowchart illustrating processing by the slave device in the second embodiment of the invention. In FIGS. 8 and 9, steps identical to steps shown in FIGS. 5 and 6 have the same reference characters. FIG. 1 will also be referred to in the description of the second embodiment.

In the first embodiment, the value of timer 206 is referred to after the command analysis process is completed in the slave device (step S521 in FIG. 6). In contrast, the second embodiment is configured, as shown in FIGS. 8 and 9, to check whether the command analysis process has been completed or not (step S540 in FIG. 9), and if it has not been completed, to refer to the value of timer 206 and check whether or not the value of timer 206 exceeds the threshold value (step S541 in FIG. 9).

Specifically, in step S520 in FIG. 9, CPU 210 controls IIC control unit 205, drives the SCL signal line 30 low, and checks whether command analysis is completed (step S540); if command analysis is not completed, it checks the value of timer 206 (step S541). Next, if the value of timer 206 does not exceed the threshold value, CPU 210 returns to step S520; if the value of timer 206 exceeds the threshold value, it proceeds to step S524. If command analysis is completed in step S540, CPU 210 proceeds to step S528.

With this scheme, CPU 210 can detect that the value of timer 206 exceeds the threshold value before command analysis is completed. Therefore, when the value of timer 206 overruns the threshold value, command analysis processing that has become unnecessary can be cancelled, which can reduce the processing load on the slave device 20.

In other regards, the second embodiment is the same as the first embodiment.

Third Embodiment

In the first embodiment, when processing in the slave device 20 ends (after execution of step S505, step S513, step S518, step S527, or step S531), the slave device 20 starts the IIC communication process (step S501) because it does not know when the next start condition will be transmitted from the master device 10. In contrast, the third embodiment is configured to start the IIC communication process (step S501) on the basis of the completion of the process for receiving a command. The third embodiment will be described with reference to FIGS. 1, 5, and 6.

The processing in the third embodiment will be described in detail. If CPU 210 starts the process in step S501 before completing preparations to copy data in reception FIFO 204 onto RAM 212 and data accumulate in reception FIFO 204 due to command reception from the master device 10, IIC control unit 205 can control SCL control unit 201 to have the SCL signal line 30 driven low, thereby stopping the high/low control of the SCL signal line 30 performed by SCL control unit 101 in the master device 10 (thus stopping the clock operation of the SCL signal line 30). Other master devices (not shown), however, then become unable to access the IIC bus, lowering the performance of the overall communication system consisting of the IIC bus and the communication devices connected to it.

Accordingly, in the third embodiment, the CPU 210 in the slave device 20 performs control such that the IIC reception process is not started when the processing for receiving data from the master device 10 cannot be carried out, but is started when the processing for receiving a command from the master device 10 is completed.

With this scheme, reception processing can take place after it has definitely become possible for the slave device to receive a command from the master device, so commands from the master device can be received more reliably.

In other regards, the third embodiment is the same as the first embodiment.

Fourth Embodiment

Figure 10:
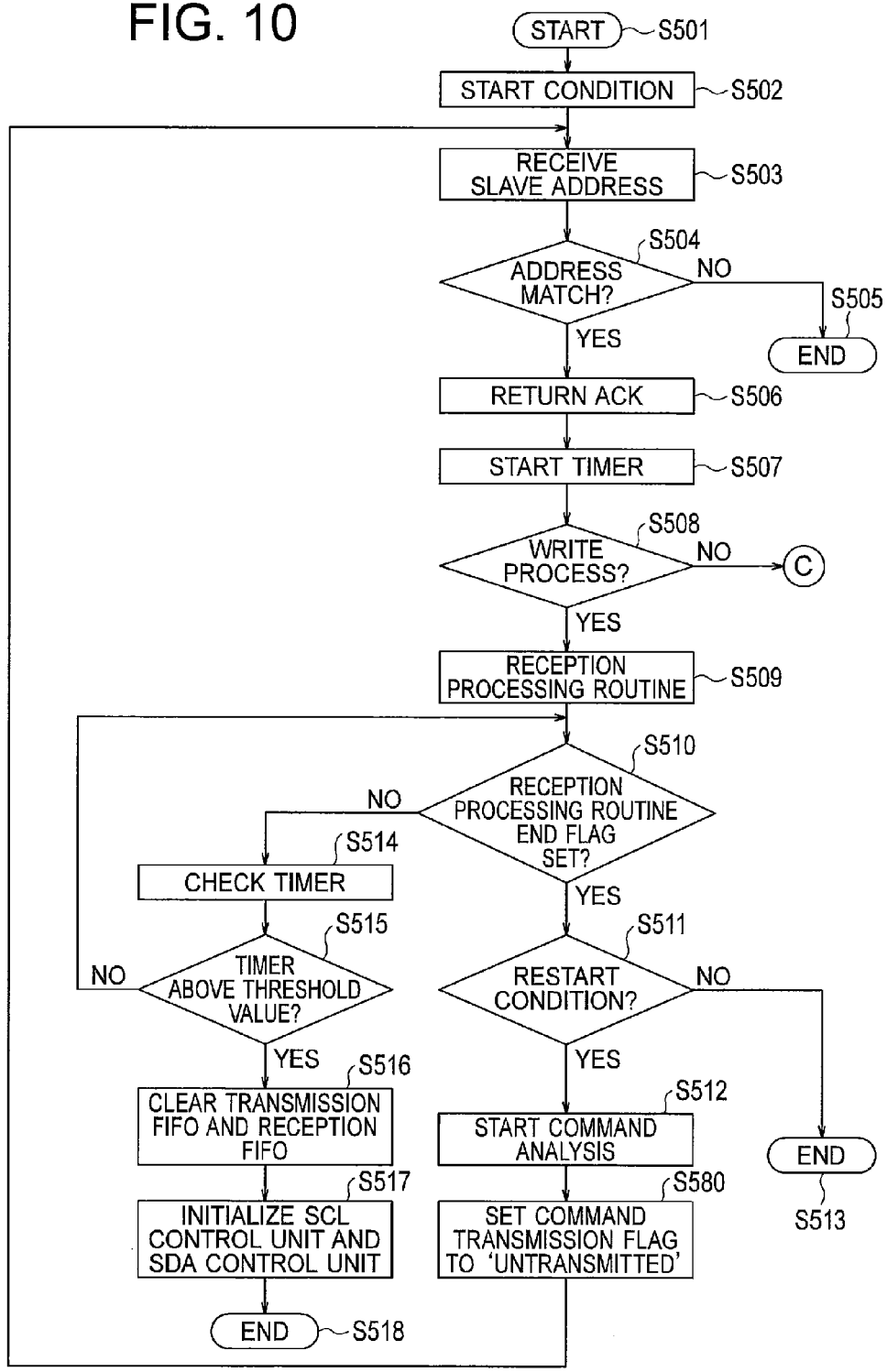
FIG. 10 is a flowchart (part 1) illustrating processing performed by the slave device in a fourth embodiment of the invention.
Figure 11:
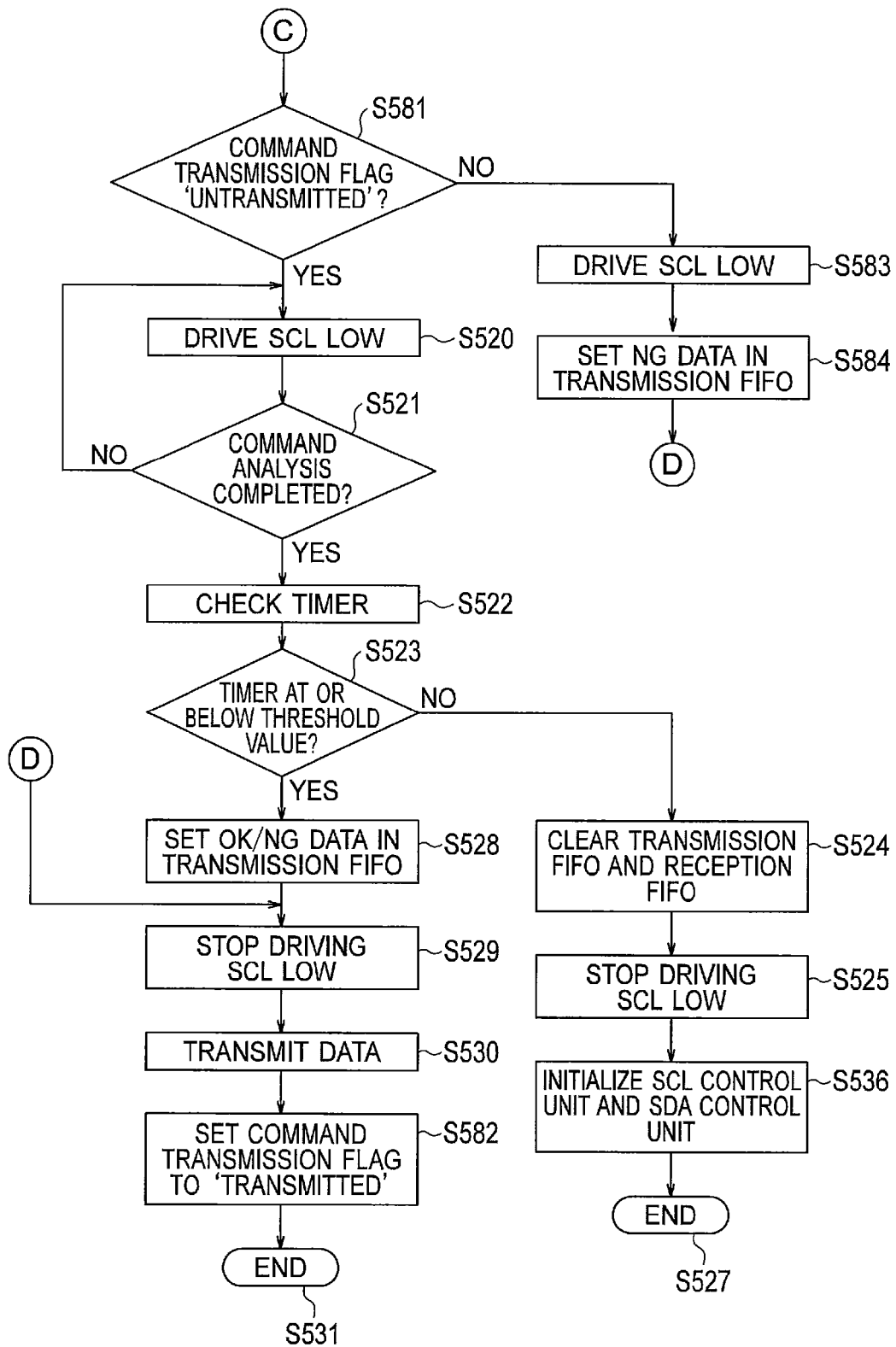
FIG. 11 is a flowchart (part 2) illustrating processing performed by the slave device in the fourth embodiment of the invention.

FIGS. 10 and 11 are flowcharts illustrating processing performed by the slave device in the fourth embodiment of the invention. In FIGS. 10 and 11, steps identical to steps in FIGS. 5 and 6 have the same reference characters. FIG. 1 will also be referred to in the description of the fourth embodiment.

The first embodiment showed an example in which, after the slave device 20 receives data under write control by the master device 10 and begins command analysis (step S512 in FIG. 5), read control by the master device 10 starts immediately to check for completion of the command analysis (step S521 in FIG. 6).

In the first embodiment, however, the slave device 20 returns OK or NG data in reply to the read control from the master device 10 on the basis of the command analysis result, so without an analysis result, it cannot return either OK or NG data. Accordingly, if the slave device executes a read process directly, without a write process from the master device 10, it cannot return either OK or NG data. The fourth embodiment enables the slave device 20 to return NG data when it executes a read process directly, without a write process from the master device 10.

In FIGS. 10 and 11, after starting command analysis (step S512), CPU 210 sets a command transmission flag to 'untransmitted' (step S580). After data transmission (step S530), CPU 210 sets the command transmission flag to 'transmitted' (step S582). In the initial (i.e., default) state of the slave device 20, CPU 210 sets the command transmission flag to 'transmitted'.

After deciding whether received data include a write control bit or a read control bit (step S508), when CPU 210 decides that a read control bit is included, it decides whether the command transmission flag is 'untransmitted' or 'transmitted' (step S581); if the decision result is 'untransmitted' it controls IIC control unit 205 to have the SCL signal line driven low (step S520); if the decision result is 'transmitted', it controls IIC control unit 205 to have the SCL signal line 30 driven low (step S583), sends NG data to transmission FIFO 203 (step S584), and then performs the processes in step S529 and the subsequent steps in FIG. 11, changing the command transmission flag to 'transmitted' in step S582.

With this scheme, even when the master device 10 executes read processing directly, NG data can be returned in response, preventing an IIC data communication malfunction.

In other regards, the fourth embodiment is the same as the first embodiment.

REFERENCE CHARACTERS

10 master device, 20 slave device, 30 SCL signal line (clock signal line), 31 SDA signal line (data signal line), 32 SCL signal line pull-up resistor, 33 SDA signal line pull-up resistor, 101 SCL control unit (clock control unit), 102 SDA control unit (data control unit), 103 transmission FIFO (transmission data temporary storage), 104 reception FIFO (reception data temporary storage), 105 IIC control unit, 106 timer, 107 timer threshold value storage unit, 110 CPU, 111 ROM, 112 RAM, 113 computational processing unit, 120 control unit (CPU 110 and IIC control unit 105), 201 SCL control unit (clock control unit), 202 SDA control unit (data control unit), 203 transmission FIFO (transmission temporary data storage unit), 204 reception FIFO (reception temporary data storage unit), 205 IIC control unit, 206 timer, 207 timer threshold value storage unit, 210 CPU, 211 ROM, 212 RAM, 213 computational processing unit, 214 command analysis unit, 215 slave address storage unit, 220 control unit (CPU 210 and IIC control unit 205).

What is claimed is:
1. A communication device operating in a slave mode that receives a command transmitted from a communication device operating as a master device, by use of a synchronous serial communication bus including a clock signal line for transmitting a clock signal and a data signal line for transmitting data, analyzes the command, and returns a result of the analysis to the master device by use of the bus, the communication device operating in the slave mode comprising:
   a timer that starts when the master device starts communication with the communication device operating in the slave mode;
   a timer threshold value storage unit that stores a predetermined threshold value;

a clock control unit that receives the clock signal from the master device through the clock signal line, and performs control for stopping the clock signal from being sent from the master device;

a data control unit that transmits data to and receives data from the master device through the data signal line;

a transmission temporary storage unit that temporarily saves the data transmitted by the data control unit;

a command analysis unit that analyzes the command transmitted from the master device; and a control unit;

wherein the control unit when requested from the master device to return a result of the analysis in the command analysis unit, controls the clock control unit to make the master device stop the clock signal while the command analysis unit analyzes the command, compares a value of the timer with the threshold value stored in the timer threshold value storage unit, if a result of the comparison is that the value of the timer is equal to or less than the threshold value, saves transmit data in the transmission temporary storage unit, cancels the control by the clock control unit for stopping the clock signal, and has the data control unit transmit the data saved in the transmission temporary storage unit to the master device in synchronization with the clock signal received by the clock control unit, and if the result of the comparison is that the value of the timer exceeds the threshold value, cancels the control by the clock control unit for stopping the clock signal, places the clock control unit in a state to receive the clock signal, and places the data control unit in a state to receive a slave address indicating a communication device operating in the slave mode.

2. The communication device of claim 1, wherein the control unit performs processing for comparing the value of the timer with the threshold value after the command analysis by the command analysis unit is completed.

3. The communication device of claim 1, wherein the control unit:

starts processing for comparing the value of the timer with the threshold value before command analysis by the command analysis unit is completed; and if the result of the comparison is that the value of the timer exceeds the threshold value, then regardless of whether the command analysis by the command analysis unit is completed or not, cancels the control by the clock control unit for stopping the clock signal, places the clock control unit in the state to receive the clock signal, and places the data control unit in the state to receive the slave address indicating the communication device operating in the slave mode.

4. The communication device of claim 1, further comprising a reception temporary storage unit that temporarily saves the data transmitted from the master device, wherein:

when receiving the data transmitted from the master device, the communication device compares the value of the timer and the threshold value stored in the timer threshold value storage unit, and if the value of the timer exceeds the threshold value, clears the data in the reception temporary storage unit, cancels the control by the clock control unit for stopping the clock signal, places the clock control unit in the state to receive the clock signal, and places the data control unit in the state to receive the slave address indicating the communication device operating in the slave mode.

5. The communication device of claim 4, wherein the control unit does not start processing for reception from the master device until it is ready to read data from the reception temporary storage unit.

6. The communication device of claim 1, wherein the control unit:

sets a command transmission flag to indicate 'untransmitted' after the command analysis by the command analysis unit starts;

sets the command transmission flag to indicate 'transmitted' after the command analysis by the command analysis unit is completed and the result of the analysis has been transmitted to the master device; and when requested from the master device to return the result of the analysis by the command analysis unit, determines the data to return on a basis of the command transmission flag.

7. The communication device of claim 1, wherein:

the clock signal line is an SCL signal line;

the data signal line is an SDA signal line; and the synchronous serial communication bus is an IIC bus.

8. A communication system, comprising:

a master device, which is a communication device that operates in a master mode, using a synchronous serial communication bus including a clock signal line for transmitting a clock signal and a data signal line for transmitting data; and a slave device, which is a communication device that operates in a slave mode, that receives a command transmitted from the master device, analyzes the command, and returns a result of the analysis to the master device by use of the bus; wherein the slave device is the communication device of claim 1.

9. The communication system of claim 8, wherein:

the master device comprises:

a first timer that starts when communication with the communication device operating in the slave mode starts;

a first timer threshold storage unit for storing a predetermined first threshold value;

a first clock control unit that controls the clock signal transmitted via the clock signal line;

a first data control unit that transmits and receives data via the data signal line;

a first transmission temporary storage unit that temporarily saves data transmitted by the first data control unit; and a first control unit; wherein whenever the master device transmits data to the slave device or receives data from the slave device, the master device compares a value of the first timer with the first threshold value stored in the first timer threshold value storage unit, and initializes the first clock control unit and the data control unit if the value of the first timer exceeds the first threshold value.

10. The communication system of claim 9, wherein the first threshold value stored in the first timer threshold storage unit in the master device and the threshold value stored in the timer threshold storage unit of the slave device are identical.

11. A communication method employed in a communication device operating in a slave mode, for receiving a command transmitted from a master device, which is a communication device operating in a master mode, by use of a synchronous serial communication bus including a clock signal line for transmitting a clock signal and a data signal line for transmitting data, analyzing the command, and returning a result of the analysis to the master device by use of the bus, the communication method comprising the steps of:

starting a timer when the master device starts communicating with the communication device operating in the slave mode;

controlling a clock control unit to receive the clock signal from the master device via the clock signal line or stop the clock signal from being sent from the master device;

having a data control unit transmit data to and receive data from the master device via the data signal line;

temporarily saving the data transmitted by the data control unit in a transmission temporary data storage unit; and analyzing the command transmitted from the master device;

wherein when the master device requests return of a result of command analysis, control is performed to make the master device stop the clock signal while the command is analyzed;

a value of the timer is compared with a threshold value prestored in a timer threshold value storage unit;

if a result of the comparison is that the value of the timer is equal to or less than the threshold value, transmit data are saved in the transmission temporary data storage unit, the control for stopping the clock signal is cancelled, and the data saved in the transmission temporary storage unit are transmitted to the master device in synchronization with the clock signal received by the clock control unit; and if the result of the comparison is that the value of the timer exceeds the threshold value, the control by the clock control unit for stopping the clock signal is cancelled, the clock control unit is placed in a state to receive the clock signal, and the data control unit is placed in a state to receive a slave address indicating a communication device operating in the slave mode.

12. The communication method of claim 11, wherein processing for comparing the value of the timer with the threshold value is performed after the command analysis by the command analysis unit is completed.

13. The communication method of claim 11, wherein:
processing for comparing the value of the timer with the threshold value is started before the command analysis by the command analysis unit is completed; and if the result of the comparison is that the value of the timer exceeds the threshold value, then regardless of whether the command analysis by the command analysis unit has been completed or not, the control by the clock control unit for stopping the clock signal is cancelled, the clock control unit is placed in the state to receive the clock signal, and the data control unit is placed in the state to receive the slave address indicting the communication device operating in the slave mode.

14. The communication method of claim 11, further comprising a reception temporary storage unit for temporarily saving data transmitted from the master device, wherein when data transmitted from the master device are received, processing for comparing the value of the timer with the threshold value stored in the timer threshold storage unit is performed, and if the value of the timer exceeds the threshold value, data in the receiving temporary data storage unit are cleared, control by the clock control unit for stopping the clock signal is cancelled, the clock control unit is placed in the state to receive the clock signal, and the data control unit is placed in the state to receive the slave address indicating the communication device operating in the slave mode.

15. The communication method of claim 14, wherein processing for reception from the master device does not start until the communication device is ready to read data from the reception temporary storage unit.

16. The communication method of claim 11, wherein:
after the beginning of the command analysis, a command transmission flag is set to indicate 'untransmitted';

after the command analysis is completed and the result of the analysis has been transmitted to the master device, the command transmission flag is set to indicate 'transmitted';

when there is a request from the master device to return the result of the analysis, the data to return are determined on a basis of the command transmission flag.

17. The communication method of claim 11, wherein:
the clock signal line is an SCL signal line;
the data signal line is an SDA signal line; and
the synchronous serial communication bus is an IIC bus.

* * * * *